United States Patent [19]

Hughes

[11] 4,322,332
[45] Mar. 30, 1982

[54] HIGH TEMPERATURE PAINT

[75] Inventor: Raymond B. Hughes, Schenectady, N.Y.

[73] Assignee: General Electric Company, Schenectady, N.Y.

[21] Appl. No.: 172,013

[22] Filed: Jul. 24, 1980

[51] Int. Cl.$^3$ ............................................. C08L 75/04
[52] U.S. Cl. ..................................... 525/424; 528/73; 528/45
[58] Field of Search ................... 260/37 N; 525/424; 528/45, 73

[56] References Cited

U.S. PATENT DOCUMENTS

| | | |
|---|---|---|
| 3,847,867 | 11/1974 | Heath et al. .................. 260/47 CP |
| 3,852,106 | 12/1974 | Incremona et al. ................. 525/424 |
| 3,991,004 | 11/1976 | Takekoshi et al. ............... 260/37 N |
| 4,026,833 | 5/1977 | D'Alelio .............................. 525/424 |
| 4,048,142 | 9/1977 | Takeoshi .......................... 260/37 N |

*Primary Examiner*—Lewis T. Jacobs
*Attorney, Agent, or Firm*—Hedman, Casella, Gibson & Costigan

[57] ABSTRACT

A paint having desirable high temperature properties particularly suitable for industrial applications is described. The paint is composed of a conventional pigment in combination with a polyimide reaction product of a bis (etheranhydride) with a diamine compound, said reaction product being cross-linked with a tri-functional isocyanate agent.

12 Claims, No Drawings

HIGH TEMPERATURE PAINT

INTRODUCTION TO THE INVENTION

The invention involves a paint having desirable high temperature properties. It is particularly useful for industrial applications where it may be exposed to extreme heat.

The invention is predicated upon the combination of a pigment with a unique resin binder. The binder is a polyimide reaction product of a bis (etheranhydride) with a diamine compound, that reaction product being cross-linked with a tri-functional isocyanate agent.

DESCRIPTION OF THE INVENTION

The present paints are of general, conventional composition. They include one or more pigments and a resin binder. Prior to application, pigment paste is added to the resin solution, dispersed and applied. It is this composition which may be applied to coat a desired surface.

After application (and removal of solvent, as by baking, the binder forms a solid matrix film containing the pigment. In this form, the present paints evidence unique, high temperature properties. This makes them particularly suitable for industrial applications where exposure to harsh conditions is most common.

The pigment(s) employed in the present paints may be selected from among the conventional such materials. At least one, and normally a combination of several different pigments and fillers are utilized. Commonly included may be one or more metallic—e.g. lead, chrome or zinc—based pigments. From 1 to 5% pigment by resin weight is desirably utilized.

The resin binder employed in the present paints is a polyamide which has been cross-linked with a tri-functional agent. It is this cross-linked polyimide which is responsible for the high temperature properties of these paints.

This polyimide may be formed from any suitable bis (etheranhydride). A wide variety of such anhydrides are described in U.S. Pat. No. 3,847,867 of Darrell R. Heath, the complete disclosure of which is incorporated herein by reference.

Representation of these bis (etheranhydride) are ones having the formula:

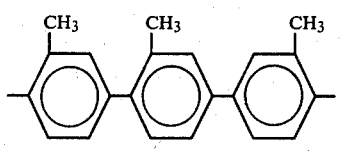

wherein R is a member selected from the class consisting of (a) the following divalent organic radicals:

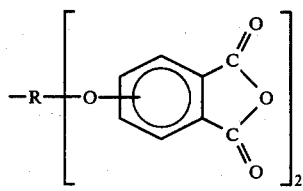

-continued

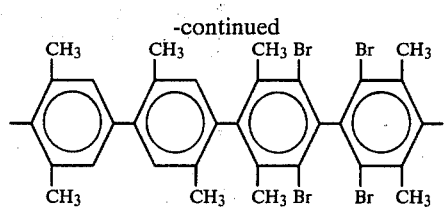

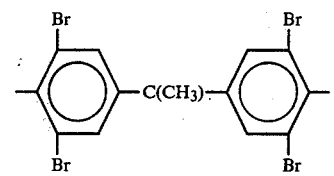

and (b) divalent organic radicals of the general formula:

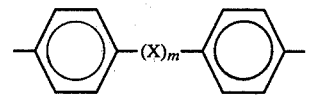

where X is a member selected from the class consisting of divalent radicals of the formulas:

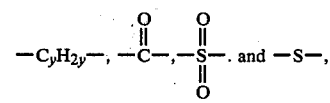

where m is 0 or 1, y is a whole number from 1 to 5, and the divalent bonds of the —O—R—O— radical are equally situated on the phthalic anhydride end groups, e.g., in the 3,3'-positions or the 4,4'-positions.

In a preferred embodiment, the polyimide may be formed through reaction between a diamine compound and bis-phthalic anhdyride having the formula:

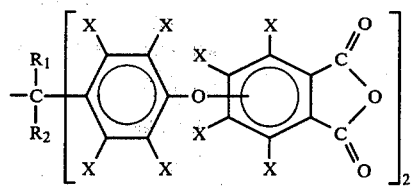

wherein: each of $R_1$ and $R_2$ is an alkyl group of from 1 to 4 carbons; each X is selected from the group of a halide, an alkyl of 1 or 2 carbons and hydrogen.

Polymerization of the bis (etheranhydride) is achieved through reaction with a primary diamine compound. Suitable diamine compounds are readily available. Virtually any compound may be employed, although aromatic diamines are preferred.

These diamine compounds have the formula:

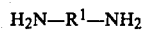

$H_2N-R^1-NH_2$ $R^1$ may comprise essentially any divalent organic radical. Representative radicals include (a) aromatic hydrocarbon radicals having from 6–20 carbon atoms and halogenated derivatives thereof, (b) alkylene radicals and cycoalkylene radicals having from 2–20 carbon atoms $C_{(2-8)}$ alkylene terminated polydiorganosiloxane, and (c) divalent radicals included by the formula:

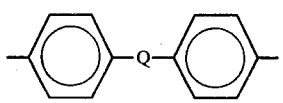

where Q is a member selected from the class consisting of

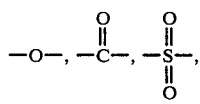

—S—, and —$C_xH_{2x}$—, and x is a whole number from 1 to 5 inclusive.

Cross-linking of the polyimide is accomplished utilizing a tri-functional isocyanate agent. Again, there is no criticality as to the agent and one of the commercially available agents mentioned below is most conveniently employed.

To facilitate the cross-linking reaction, it is preferred to utilize blocked agent. Such blocked polyisocyanates are known in the polyester art. The term "blocked" means that the polyisocyanate has been reacted with a group that will split off at the temperature employed with the polymeric ether imide. As polyisocyanate components there may be mentioned the cyclic trimer of 2,4-tolylene diisocyanate; mixtures of the cyclic tricyanate; 4,4'-diphenyl 2,4,6-triisocyanato toluene, and the like.

Typical compounds which can be used to block the isocyanate groupings, e.g., by forming phenol; meta-cresol, para-cresol; ortho cresol and mixtures thereof; the xylenols, e.g., 2,6-dimethylphenol; 4-ethyl phenol, 4-t-butylphenol; 2-butylphenol; 4-n-octylphenol; 4-isooctylphenol, etc., monohydric alcohols, such as methyl alcohol; ethyl alcohol, n-propyl alcohol, and the like, acetoacetic ester, hydroxyalkylcarbamic acid aryl esters, e.g., hydroxyethylcarbamic acid phenylester, mercaptans, e.g., 2-mercaptobenzothiazole, methyl mercaptans, and the like.

Others include the cyclic trimer of 2,4-tolylene diisocyanate having the isocyanate groups blocked with tertiary butyl alcohol or tertiary amyl alcohol or dimethyl ethinyl carbinol or acetoacetic acid ester or phenol or cresylic acid or $\epsilon$-caprolactam or 2-mercaptobenzothiazole, or succinimide or phthalimide or diphenyl amine or phenol-$\beta$-naphthylamine, triphenyl methane triisocyanate having the isocyanate groups blocked with phenol or mixed cresols or tertiary butyl alcohol or phthalimide, 1,3,3-pentanetriisocyanate having the isocyanate groups blocked with m-cresol, etc.

As specific examples of such blocked isocyanates there may also be mentioned Mondur S, wherein the isocyanate groups of the reaction product of 3 moles of mixed 2,4- and 2,6-tolylene diisocyanate with trimethylol propane are blocked by esterification with phenol and Mondur SH, wherein the mixed cyclic trimers or 2,4- and 2,6-tolylene diisocyanates have the three free isocyanate groups blocked by esterification with phenol. At present Mondur SH is the preferred blocked polyisocyanate.

The amount of cross-linking agent employed may vary, dependent largely upon the proportion of free amic acid groups on the polyimide utilized. Normally, however, from 0.025 to 0.1 mole of isocyanate agent is utilized for each mole of bis (etheranhydride) in the polyimide.

Cross-linking will proceed in conventional manner. Normally, however, elevated temperatures are utilized (particularly with blocked agent) to expedite this reaction. Thus, temperatures of at least about 150° C. more desirably from 150° to 250° C. for a period of 1 to 5 hours are preferred. Under these conditions, not only cross-linking, but also removal of the resin solvent, may be achieved.

The present paints containing both pigment and resin binder may be utilized in conventional manner. Ordinarily they are simply applied to the desired surface and then dried under conditions adequate to ensure cross-linking.

The resultant, dried paint forms a tough and protective coating. That coating is composed of a flexible matrix of cross-linked polyimide containing dispersed pigment. Its most remarkable properties, however, involve its resistant to elevated temperatures.

The present process is more fully described from the following example. This example is not limitative, but rather illustrative, of this invention.

EXAMPLE (a) Polyimide-solvent mixture.

800 grams of an equal molar mixture of 2,2 bis [4-(3,3-dicarboxyphenoxy) phenyl]-propane dianhydride with m-phenylene diamine (General Electric's ULTEM) were dispersed in a solvent solution of 960 grams of Solvesso 100 naptha and 2240 grams of cresylic acid.

(b) Binder resin.

81 grams of a 40% solution of trimerized toluenediisocyanate blocked with phenol (Mondur-SH) and 6.8 grams of dibutyltin delaurate were added to the mixture.

98 grams of the binder resin (b) was mixed with 2 grams of green pigment paste.

The paint was brushed onto a brick and baked for 1 hour at 250° C.

After cooling, the painted surface of the brick was examined. It showed no visible impairment as a result of the high temperature exposure.

An additional 4 hours at 250° C. still did not show any film impairment.

Other variations are possible. For example, instead of cresylic acid, N-methylpyrrolidone can be used.

I claim:

1. In a high temperature paint containing a resin binder and a pigment, the improvement wherein said resin binder comprises polyethermide reaction product of aromatic bis(etheranhydride) with organic diamine, said reaction product being cross-linked with tri-functional isocyanate agent.

2. The paint of claim 1, wherein the diamine is an aromatic diamine.

3. The paint of claim 1, wherein the aromatic bis(etheranhydride) is reacted with from 0.5 to 2 mole of diamine.

4. The paint of claim 1, wherein the bis(etheranhydride) is a bis-phthalic anhydride of the formula:

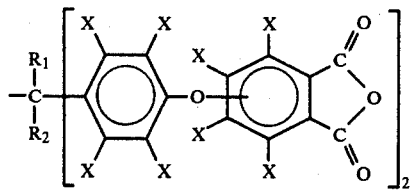

wherein: each of $R_1$ and $R_2$ is an alkyl group of from 1 to 4 carbons; each X is selected from the group of a halide, an alkyl of 1 or 2 carbons and hydrogen.

5. The paint of claim 4, wherein the anhydride is 2,2, bis[4(3,4-dicarboxphenoxy) phenyl]-propane dianhydride.

6. The paint of claim 4, wherein the diamine is m-phenylene diamine.

7. The paint of claim 4, wherein the agent is a blocked tri-functional isocyanate.

8. The paint of claim 4, wherein the polyimide is cross-linked with from 0.025 to 0.1 mole of isocyanate agent by mole of bis-phthalic anhydride in said polyimide.

9. The paint of claim 4, wherein the agent is blocked, toluenediisocyanate trimer.

10. The paint of claim 1, wherein the pigment is dispersed in a solution of the resin binder.

11. The paint of claim 1, wherein the resin binder constitutes a solid matrix film containing the pigment.

12. The paint of claim 1, wherein the polyimide is cross-linked with from 0.025 to 0.1 mole of isocyanate agent by mole of bis(etheranhydride) in said polyimide.

* * * * *